Inventors:
Robert S. Black &
James S. Carroll,

Nov. 17, 1959      R. S. BLACK ET AL      2,912,960
ROLL TYPE GLUE SPREADERS, SURFACE COATERS, AND THE LIKE
Filed Aug. 29, 1956      7 Sheets-Sheet 2

Inventors:
Robert S. Black &
James S. Carroll,
by
Atty.

Nov. 17, 1959  R. S. BLACK ET AL  2,912,960
ROLL TYPE GLUE SPREADERS, SURFACE COATERS, AND THE LIKE
Filed Aug. 29, 1956  7 Sheets-Sheet 4

Inventors:
Robert S. Black &
James S. Carroll,
by [signature] Atty.

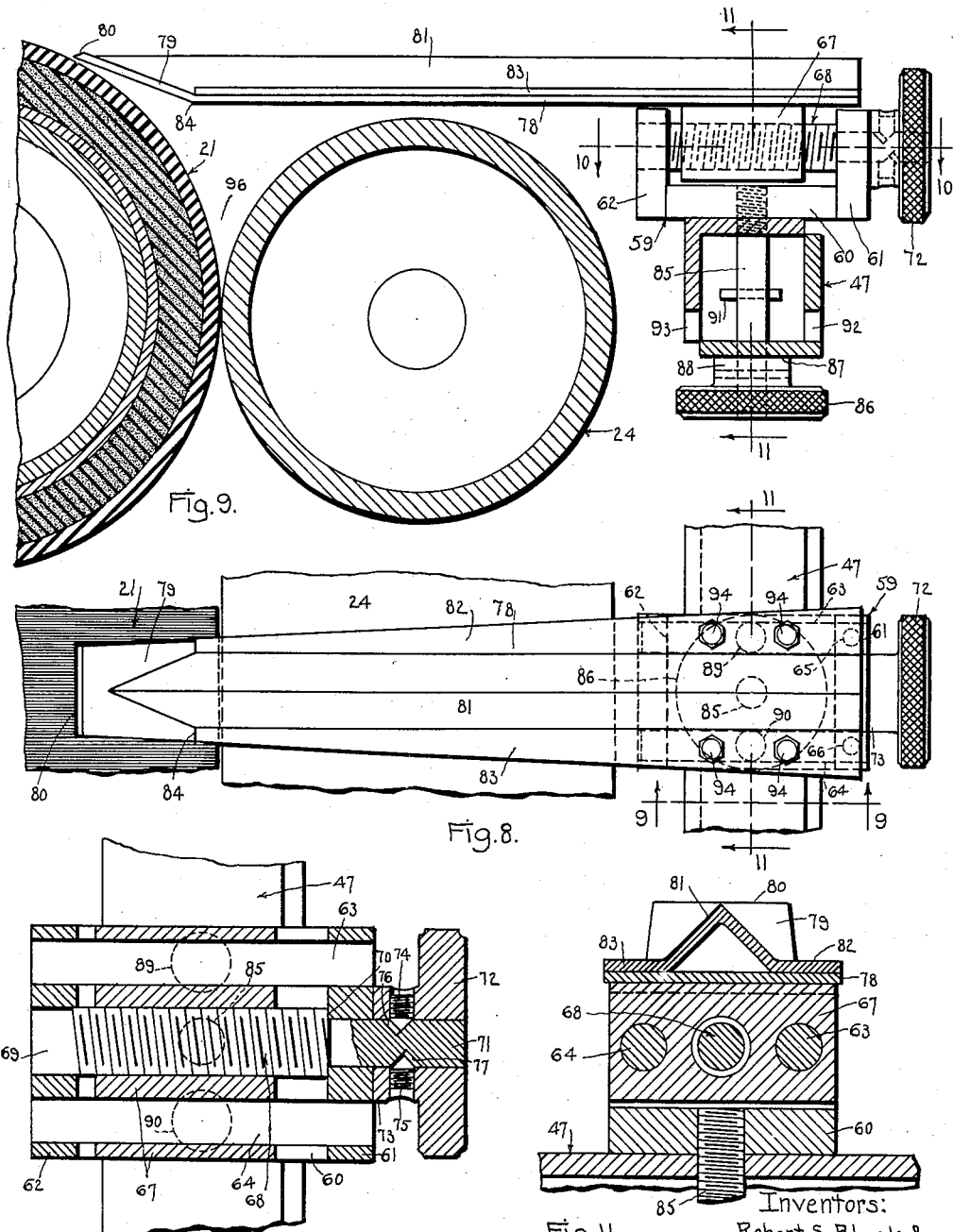

Nov. 17, 1959 R. S. BLACK ET AL 2,912,960
ROLL TYPE GLUE SPREADERS, SURFACE COATERS, AND THE LIKE
Filed Aug. 29, 1956 7 Sheets-Sheet 6
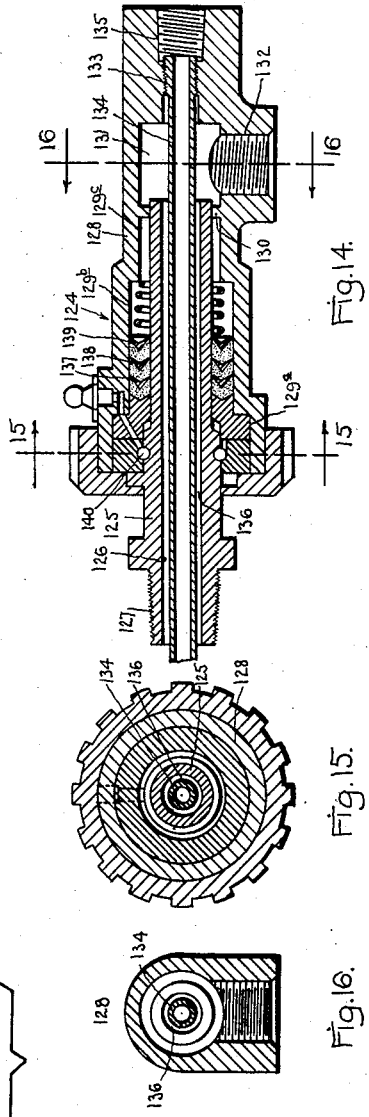
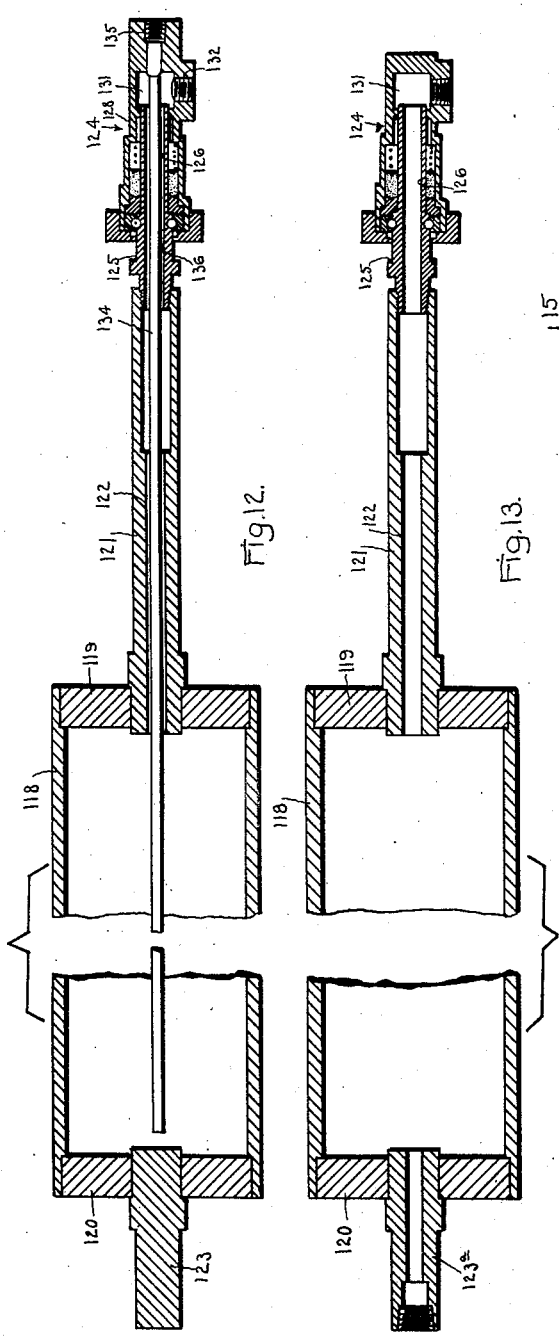
Inventors:
Robert S. Black &
James S. Carroll,

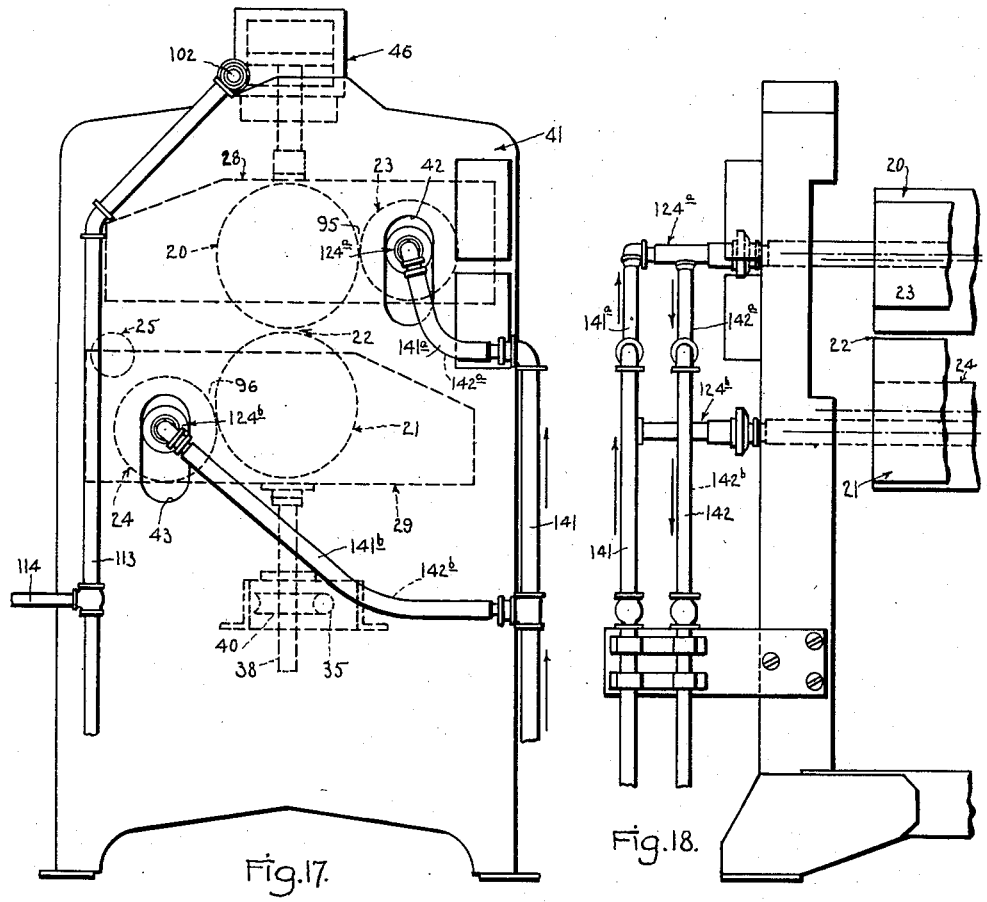
Fig. 17.
Fig. 18.
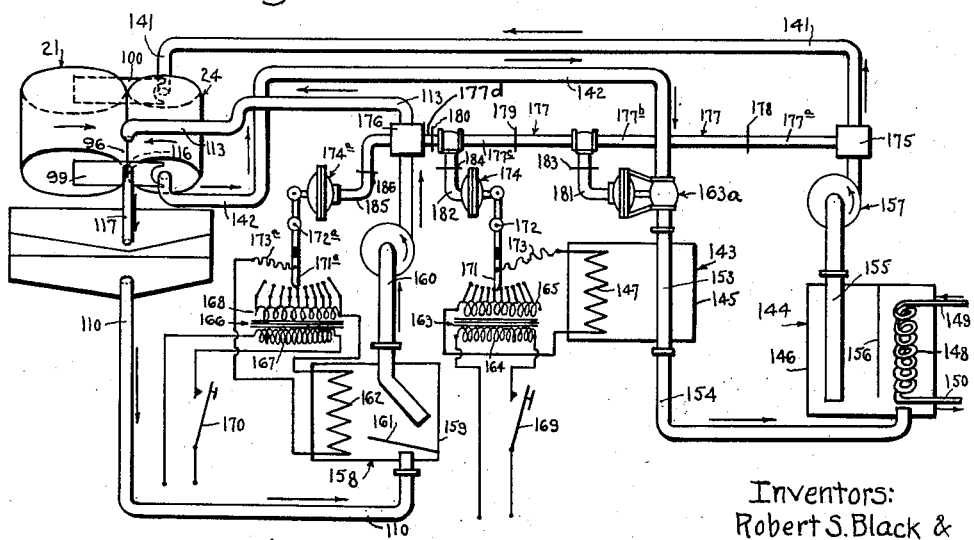
Fig. 19.
Inventors:
Robert S. Black &
James S. Carroll,

2,912,960

ROLL TYPE GLUE SPREADERS, SURFACE COATERS, AND THE LIKE

Robert S. Black and James S. Carroll, Mendota, Ill.

Application August 29, 1956, Serial No. 606,841

25 Claims. (Cl. 118—5)

This invention relates to that general type of glue spreader, or surface coated, disclosed in Letters Patent of the United States, No. 2,326,429, issued August 10, 1943 on the application of John E. Black and Robert S. Black, but as will hereinafter appear, certain features of novelty herein disclosed are not limited in their application to devices of the general type of that earlier patent and are of more general application. However, for purposes of clarity of disclosure and understanding of functioning, we will sometimes hereinafter make reference to that earlier patent. In so doing, however, we do not intend to limit the protection to be afforded by the present application and the Letters Patent to be issued thereon, except as we may do so in the claims to follow.

Generally speaking the presently disclosed device includes two "main rolls" which are journalled one above the other in a common vertical plane and with their respective axes extending horizontally, together with means to apply to the surfaces of such rolls the desired adhesive in liquid form. When both surfaces of a sheet are to be coated such adhesive is applied by maintaining both of the rolls coated with the adhesive; when only one surface of the sheet is to be coated only one of the rolls is maintained coated with the adhesive, generally the upper roll. The sheet is passed horizontally between the two rolls, for which purpose such rolls are set to a clearance between them proper to pass the thickness of the sheet then being coated. Usually a resilient device is provided in the roll supporting assembly to permit one of the rolls to shift slightly away from the other under resilient force, to take care of slight inequalities in sheet thickness and for other purposes; but the roll supporting assembly also includes means to enable the operator to accurately predetermine and maintain the normal separation between the rolls at that value which will properly receive and treat the thickness of sheets being treated. Such general types of device are disclosed in that earlier patent, and are also included in the devices herein disclosed.

In order to accurately control and predetermine the amount of adhesive which will be carried by the roll surface or surfaces to the surfaces of the sheet being treated there is provided a "doctor roll" for each main roll. Each such doctor roll is journalled parallel to its main roll and is driven at proper speed to ensure the desired control of the film of adhesive carried by the main roll to the surface to be coated. In this connection means are provided under control of the operator for accurately adjusting the separation between each main roll and its doctor roll so that the thickness of the layer of adhesive carried by the main roll to the surface being coated may be accurately controlled at all times. The main and doctor rolls are so located in the machine that surface travel of the main roll towards the sheet surface to be coated is from the above separation between the main and doctor rolls so that once the doctor roll has determined the thickness of the adhesive film being carried by the main roll's surface, that thickness will be unimpaired by any intervening unit until such main roll surface comes into engagement with the surface of the sheet being coated. Thus there is assurance that a film of adhesive of the desired thickness will actually be delivered to the surface being coated. The means to effect these results is adjustable to a fraction of a thousandth of an inch.

Means to effect the above described functions and results are disclosed in the aforesaid earlier patent as well as in the present application. The following functions and results of operation which are obtainable in devices embodying the present novel features are now stated:

The glue or other adhesive or material to be coated is supplied to the V-shaped crotch lying between the upper proximate surfaces of the main and doctor rolls, and suitable closing plates or abutments are located against the ends of the two rolls at the location of such crotch to thus prevent improper loss of the liquid material from the ends of the crotch. The direction of rotation of both rolls is from such crotch downwardly, thus carrying the film of material down through the narrow opening between the rolls. The adjusted separation between the rolls determines the thickness of the film carried by the main roll. The main roll, generally larger in diameter than the doctor roll, contacts the surface being coated and thus delivers to such surface the desired film or thickness of the adhesive or other material. It is not desired that the doctor roll shall come into contact with the surface being coated. Accordingly, the two rolls are so supported that this result obtains. It is, however, evident that each elemental area of the surface of the doctor roll comes into engagement with the liquid material contained in the crotch and remains in contact with such material for a substantial portion of the time needed for a doctor roll rotation. Thus heat transfer may and will occur between the liquid material in the crotch and the doctor roll, whenever there is a temperature differential between such elements. The amount of such heat transfer will depend on the temperature differential between the doctor roll's surface and the liquid material contained in the crotch, the heat conductivity of the doctor roll, the length of time the elemental area of the doctor roll is in contact with the material in the crotch, the amount of material carried by the doctor roll's surface as a film of such surface travels from the narrow opening between the two rolls and around and back to the crotch location, etc. Evidently the effect of such heat transfer between the liquid material and the doctor roll will be to affect the temperature of the liquid material, either raising or lowering such temperature according to the direction of the temperature differential between the doctor roll and the liquid material. By control of the doctor roll that temperature differential may be usefully applied to control the temperature of the liquid material being applied to the surface being coated. Such control may be for either raising or lowering the temperature of the liquid, and also for ensuring that the temperature of such liquid is that degree best suited to the nature and composition and specifications of the liquid material, the nature of the surfaces to which it is being applied, their form and composition, and various other factors. Generally such liquid is one of the many kinds and compositions and specifications of adhesives, but the present improvements are applicable to use in coating machines for other purposes than the application of adhesives to such surfaces. Thus, said features may also be used for the application of paint, varnish, oil, or other coating materials.

As the operations proceed, applying the material to sheet after sheet of stock which is being coated, the amount of the liquid material within the crotch is continuously depleted. Accordingly, provision must be made for either constant or intermittent replenishment of the material in the crotch. Generally that material is prepared for introduction into the crotch in such units as glue mixers and heaters or other temperature controlling agencies. By such preparation of the material shortly before its introduction into the crotch of the surface coater it is possible to closely control the specifications of such material to meet the needs of the work to be done as well as the characteristics of the coating material. Such specifications and characteristics include not only the composition of the material being prepared, but also its temperature. By such means the temperature of the material freshly introduced into the crotch of the surface coater may be closely controlled to that degree best suited to the work in hand; but having thus introduced material of the desired specifications and temperature it is evident that depreciation of the quality of the material contained in the crotch will commence and continue unless provision is made in the coating machine itself to there effect continued control of the conditions affecting any such changes of temperature as may hasten the deterioration of the material in the machine itself. It is a prime object of the present invention to provide arrangements whereby the temperature of the material actually being applied to the surface of the stock may be accurately controlled at all times during the continued running of the machine.

In connection with the foregoing it is also noted that the "pot life" of an adhesive material is largely determined by the temperature at which such adhesive material is retained while in the mixing pot, but that in order to obtain the best cementing action after such material has been applied to the surfaces being coated the material should be applied to such surfaces by the machine at a different temperature. Thus, some materials must be cooled in order to slow down their setting time sufficiently to allow for the operations of bringing together the laminations of a laminated unit, to align such laminations properly, to bring them under the proper compression per unit of area being cemented, etc. Thus, in the case of some adhesives it is desired to produce a cooling effect by use of the doctor rolls—in other cases it is desired to produce an effect due to raising the temperature of the doctor rolls, either to produce a heating of the adhesive, or to maintain a rather high temperature of such adhesives as must be applied rather hot. As illustrative of the foregoing several conditions, the following may be stated:

Frequently resinous adhesives are to be applied at relatively high room temperatures such as 80–90 degrees Fah., or thereabouts, or even higher in Southern localities, while the best temperature of such materials for a long "pot life" should be lower, for example, of the order of 60 degrees Fah. Often a catalyst is incorporated in the resinous glue to be used under high temperature conditions. Such catalyst lowers the temperature at which such a glue will "set." The addition of such catalyst makes the thermo-setting resinous glue set faster at a given temperature. However, in order to be able to use such a catalyst glue the doctor roll should be cooled to lower the temperature of the glue in the crotch between the main and doctor rolls to a temperature at which it can be used for several minutes. Therefore, for in such cases it is desired to produce a cooling effect by the doctor rolls, bringing the adhesive down to 60 degrees or thereabouts. On the contrary such adhesives as polyamides and asphalts require rather high temperatures, of the order of 400 to 450 degrees Fah. for their proper application to the surfaces being coated, and subsequent treatments. Waxes require temperatures of the order of 170 to 200 degrees Fah. In the cases of such high temperature applications it is evident that proper operation during the application of such materials by the machine requires that the doctor rolls thereof be heated, not cooled. When a cooling effect is desired, or a heating effect of not too great degree is desired, such result may be produced by passing cooling or heating water or other liquid through the doctor rolls, with a controlled rate of circulation sufficient to transfer the necessary heat units at a rate necessary to reduce or raise the temperature of the adhesive properly. Usually a differential of substantially ten degrees between the temperature of the exiting water and the desired temperature of the adhesive will produce the result sought.

When it is desired to produce a heating effect use must be made of a circulating body having characteristics qualified to produce the desired higher temperature. Usually hot water may be used for temperatures up to say 175 degrees Fah., when the coating machines are to be used at not too great altitudes above sea-level. When higher temperatures are to be produced in the doctor rolls such vapors as steam may sometimes be used, but preferably a liquid capable of sustaining temperatures high enough for the desired operation without developing too great a vapor pressure. For example, such materials as "straw oil" or other light petroleum products of the lighter oil ranges may be used for temperatures well above 400 degrees Fah., without damage to such oils, and without producing boiling or excessive vaporization thereof. When such special agents as straw oil, etc. are used as heat carrying agents it is desirable to make provision for their use in a circulating system to prevent wastage.

It is thus an object of the present invention to make provision for circulating a medium through the doctor rolls by which circulation the desired temperature of the doctor rolls may be produced, either as an increased temperature or as a reduced temperature.

Since the rate at which heat will be transferred between the adhesive carried in the crotch and/or the doctor rolls, and the circulating medium depends, among other things, on the rate at which adhesive is being transferred to the sheets of stock being treated and thus the rate of depletion of material from the crotch and the rate of replenishment of fresh material thereinto, it may sometimes be found desirable to provide automatic means to control the rate of flow of the cooling (or heating) agent through the doctor rolls. This will also depend on the temperature at which the circulating medium is introduced into the doctor roll temperature controlling system. Accordingly, we have herein also disclosed automatic means to regulate the rate of flow of the heat dissipating or delivering medium through the doctor rolls.

In order to enable use of the herein disclosed equipment for either cooling or heating the doctor rolls, depending on the nature and specifications of the adhesive to be used, we have herein disclosed arrangements which can be used for either a cooling or a heating operation to automatically maintain the desired temperature differential in either case.

In connection with the foregoing, when a heating operation is to be produced, such operation may conveniently be produced by use of electrical heaters. We have accordingly shown electrical means whereby a heating effect may be produced on the circulating medium, and other means whereby a cooling effect may be produced on the medium circulated through the rolls by proper setting of the controlling units, and with provision for effecting such heating or cooling effects automatically with various rates of movement of the heat carrying medium, water or other, through the doctor rolls.

As the coated sheets emerge from between the two main rolls, having been coated on one or both surfaces, they must be delivered free of such rolls for transfer to other operations. When the coated sheets are thin and flexible, as is usually the case when coating surface laminations of thin sheets of wood, there is danger that occasionally the emerging edge of such sheet will follow the contour of the rolls, generally the lower roll, and start winding around such roll with corresponding improper results. In fact, such an improper operation may seriously damage either one or both of the main rolls, which are generally coated with a yieldable surface such as rubber or neoprene or the like. It is another object of the present invention to provide a very reliable and dependable stripper element or elements whereby such improper operations may be prevented. In this connection it is an object of the invention to so arrange such stripper or strippers that very close settings thereof may be safely made, so that dependable stripping operations may be produced even when the sheet stock being coated is thin and flexible. In this connection it is to be noted that the stripper point or edge must not actually touch the surface of the main roll since such surface is approaching the stripper at the location of the stripping action, and such contact would in all probability result in causing the stripper to dig seriously into the surface of the roll, requiring re-surfacing of such roll or in any case a re-finishing of its surface. Other damage might and probably would follow such an improper operation. The stripper construction herein disclosed is such that the stripping point may be dependably set to very close tolerances of clearance from the roll's surface, being a tolerance of the order of one or a few thousandths of an inch. In this connection we have included in such unit a micrometer device whereby the settings may be changed from time to time by known amounts, and with great accuracy.

In connection with the foregoing it is also an object to provide a stripper having a stripping edge parallel to the axis of the roll, so that the stripping action is produced along a discreet linear dimension and is not limited to a single point location. By this means a very considerable stripping force may be developed, sufficient to ensure dependable stripping action even when the sheets are of considerable length (or width) and very thin and flexible.

It is a further object in connection with this stripping unit to provide a stripper in which the line of stripping lies substantially at or very close to the line of tangency of the projected stripping bar with the surface of the main roll. That is, the arrangement is such that the surface of the stripper bar proper extends in direction to meet the roll's surface on a tangent, and the actual stripping edge, being the end of such bar or a portion thereof, lies just short of the line of contact which such extended bar would have tangentially with the roll's surface. By this means the oncoming sheet of material is presented to the stripping edge just as it emerges from between the two rolls, and is prevented from actually commencing any curving travel around the roll itself.

The stripper herein disclosed includes a micrometer adjustment whereby the stripper bar may be accurately adjusted towards and from the point or location of stripping so that the stripping edge may be brought into exactly the proper position to obtain the foregoing relationship. Once such relationship has been established it is desirable to be able to resume it in case of an operation requiring temporary removal of the stripper unit from the frame of the machine. We have provided and disclosed herein such an arrangement. In this connection the arrangement is such that when the stripper unit is re-assembled onto the frame of the machine its stripping edge will be brought into exact parallelism with the axis of the roll without special adjustment on the part of the person making such re-assembling operation.

It is a further object of the invention to provide a stripping unit embodying the foregoing features, and in which either one or several of the stripping bars may be incorporated, depending on the length of the rolls of the surface coating machine. Generally the stripping bars should be separated by not more than, say, twenty to twenty-four inches to ensure dependable operation when treating thin flexible sheets.

A further feature and object of the present invention relates to the doctor roll surfacing, and the treatment thereof prior to finishing. In this connection it is known that it is highly desirable to provide a doctor roll having a highly polished surface so that the adhesive will not accumulate and tend to "pile up" on such surface. In Letters Patent of the United States, No. 2,343,363, issued March 7, 1944 of the application of John E. Black and Robert S. Black, there is disclosed a form of doctor roll having a chromium finish of smooth nature, the same being used in connection with main rolls surfaced with rubber, neoprene, and the like. Extensive use of such chromium surfaced doctor rolls has disclosed that after a time small blisters or slightly raised surface elements occur in the surface of the chromium so that the smoothness of the doctor roll is impaired, and resurfacing or other treatment, or substitution of new rolls is necessary. We have found that these deleterious effects and results are often or generally due to corrosion of the steel or iron tubular base which comprises the body of the doctor roll. This corrosion is produced by ingress of minute quantities of foreign acid like matter from the glue or other adherent used and coming to the doctor roll over long intervals of time, such foreign matter being carried as a very small amount of impurity in the glue itself. When minute even pin point openings occur in the chromium surface of the roll corrosion of the iron or steel base occurs and after a time the chromium surface at the locations of such corrosions becomes loosened or broken so that the damage thus extends from the interior of the roll to and through its surfacing.

We have discovered that these ill effects may be prevented by interposing a thin layer of nickel or copper between the iron or steel base and the surface coating of chromium, such interlayer of nickel or copper serving to block off any access of the troublesome acid from the iron or steel base of the roll. Such interlayer of nickel or copper may be a thickness of the order of 0.002 inch (two one-thousandths of an inch) the chromium surface comprising a plated deposit of chromium of the order of 0.001 to 0.005 inch thickness, highly polished. We have found that this construction of doctor roll effectively insulates against the ingress of the small percent of acetic acid and other acids, frequently found in polyvinyl adhesives, and other corrosive agents present in small amounts as impurities in various adherents.

Other objects and uses of the invention will appear from a detailed description of the same, which consists in the features of construction and combinations of parts hereinafter described and claimed.

Figure 4:
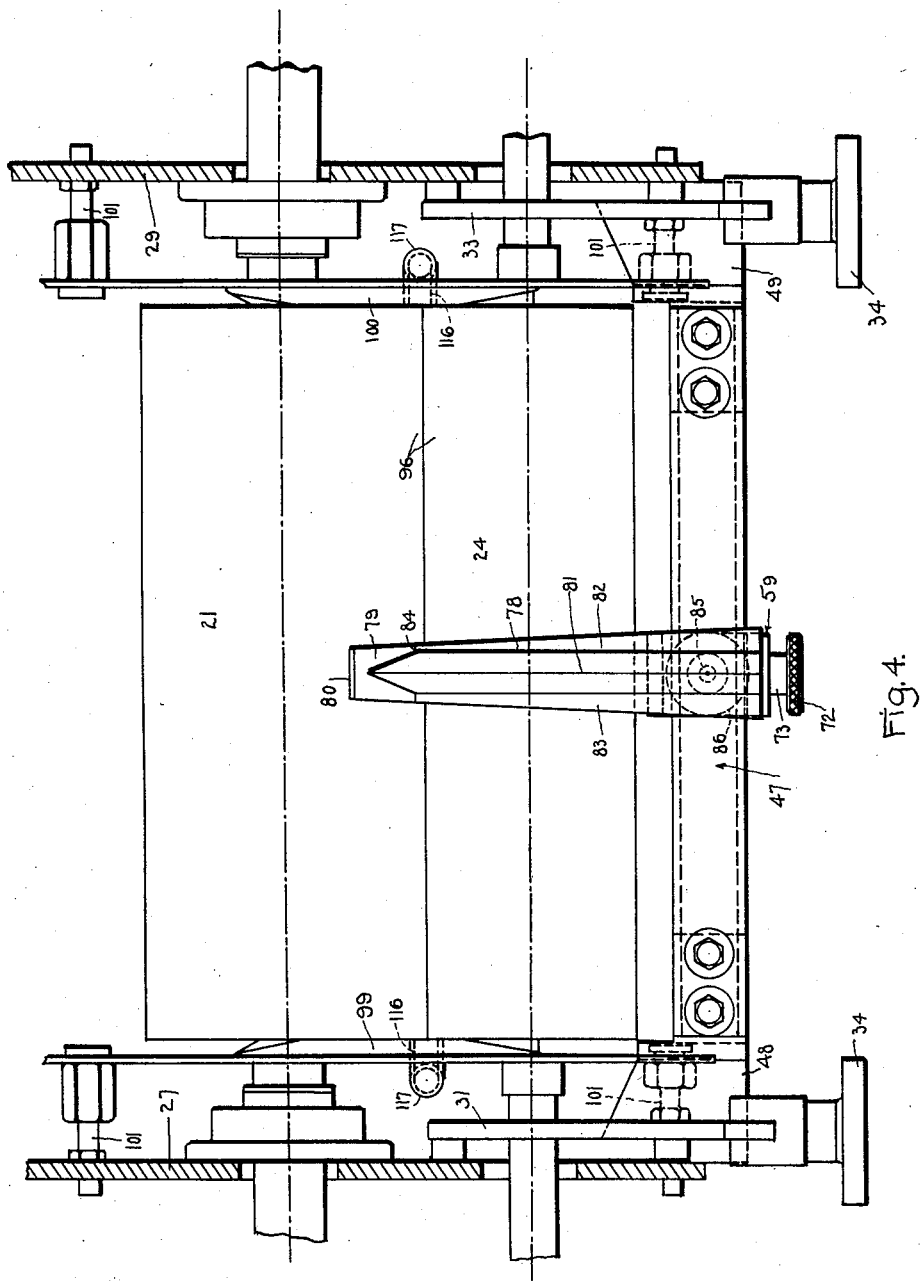
Figure 5:
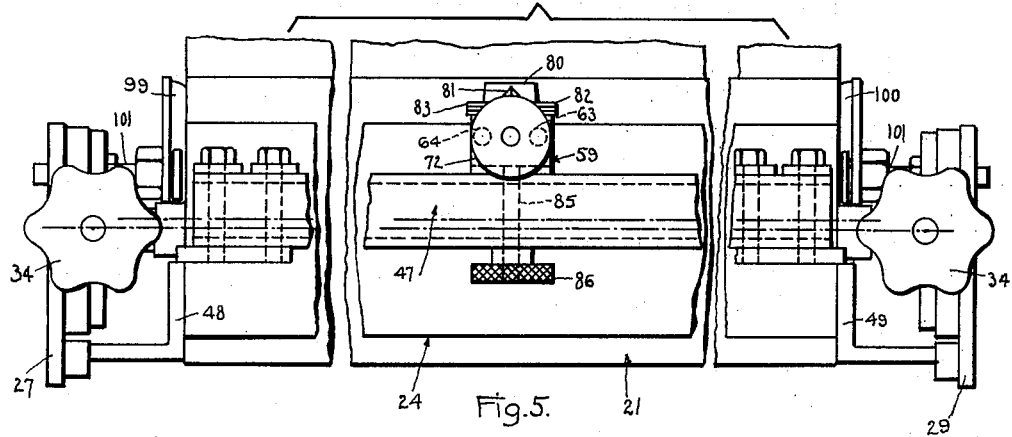
Figure 7:
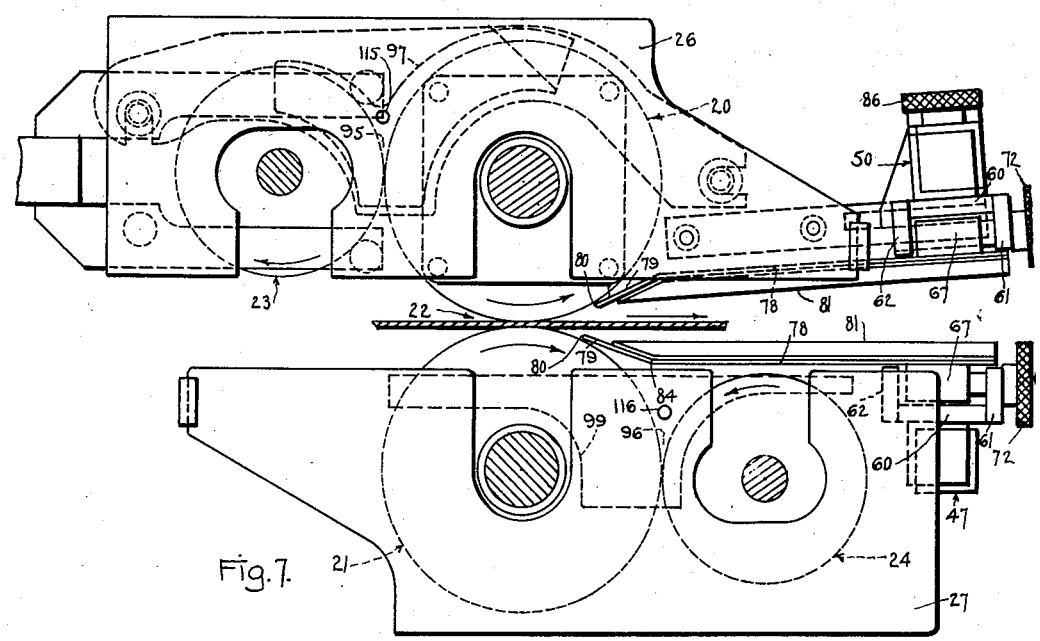
Figure 6:
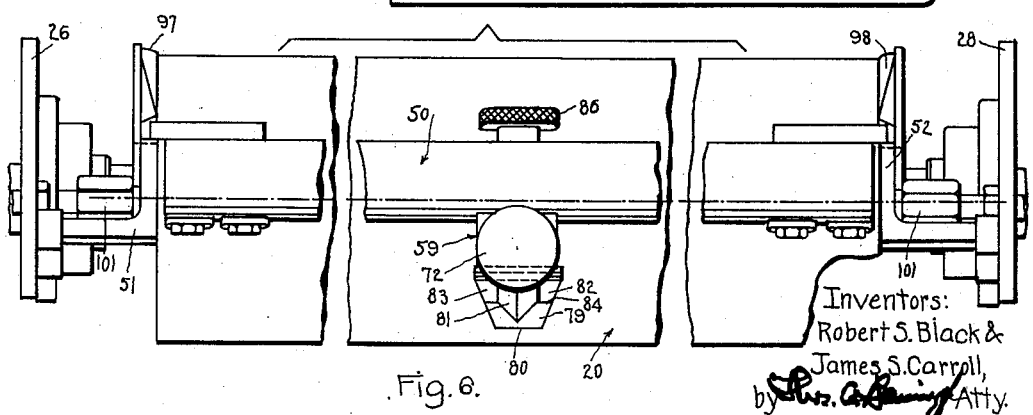

Figure 4 shows a plan view of a stripper unit for the lower main roll incorporating the novel features of our present invention; and in this figure there is shown the frame which is attached to and carried by the lower bracket plates so that such frame retains a definite fixed relation to the lower main roll which is journalled to such bracket plates; and in this figure there is shown only one stripper bar, the unit being shortened lengthwise of the machine as compared to other figures;

Figure 5 shows a rear elevation of the stripper unit shown in Figure 4, but with the frame shortened by cutting out portions thereof to shorten the figure; this figure showing the stripper unit for the lower main roll;

Figure 6 shows a view corresponding to Figure 5, but showing the stripper for the upper main roll;

Figure 7 shows a left-hand end elevation of the upper and lower strippers for the two main rolls in their relative positions, being a view looking at the left-hand ends of said elements corresponding to Figures 5 and 6;

Figure 8 shows a plan detail view of the stripper bar and the bracket by which it is attached to the stripper frame element, being a plan view of the stripper for the lower main roll;

Figure 9 shows a vertical longitudinal section taken on the line 9—9 of Figure 8, looking in the direction of the arrows;

Figure 10 shows a fragmentary horizontal section taken on the line 10—10 of Figure 9, looking in the direction of the arrows; and this figure shows in detail the micrometer adjustment whereby the stripper bar may be adjusted towards and from the main roll's surface to adjust the clearance between the end edge of the stripper bar and the roll's surface to a nicety;

Figure 11 shows a fragmentary vertical cross-section taken on the line 11—11 of Figures 8 and 9, looking in the directions of the arrows; and this figure shows the elements by which the stripper bar is brought into exact right-angular relation to the frame of the stripper when replaced on such frame;

Figure 12 shows a longitudinal section through one of the doctor rolls, with an end fixture connected thereto for introduction of water or other temperature controlling medium, such end fixture being of construction such that a continuous flow of such medium may be maintained into and through the length of the doctor roll, with discharge of the medium at the same end as that of entry of such medium;

Figure 13 shows a view similar to that of Figure 12, but with provision for discharge of the medium at the end of the doctor roll opposite to that of entry of such medium;

Figure 14 shows a longitudinal section through the end fixture whereby the medium is introduced into and delivered from the same end of the doctor roll, being on enlarged scale as compared to Figure 12;

Figure 15 shows a cross-section taken on the line 15—15 of Figure 14, looking in the direction of the arrows;

Figure 16 shows a cross-section taken on the line 16—16 of Figure 14, looking in the direction of the arrows;

Figure 17 shows a left-hand end view of a surface coater embodying features of our present invention, in more or less schematic form, and this figure shows the connections for supply of adhesive or other material to the manifold whereby the nozzles which deliver such material to the crotches are fed; and also shows the connections for delivery and discharge of heating or cooling medium to the doctor rolls, certain of such connections being hidden in this figure by other connections directly in advance thereof;

Figure 18 shows a front elevational view corresponding to Figure 17, being the left-hand end of the front of the machine; and this figure shows the supply and discharge connections for the heating or cooling medium; and Figure 19 shows a schematic layout of a system for supplying heat controlling medium to the doctor rolls, and for supplying the adhesive to the crotches, with provisions for returning the unused adherent to the system for re-use thereof; and this figure shows both heating and cooling provisions for both the main and the doctor roll medium for temperature control, with automatic means to regulate the heating and/or cooling actions, or provision for manual control thereof.

Figure 1:
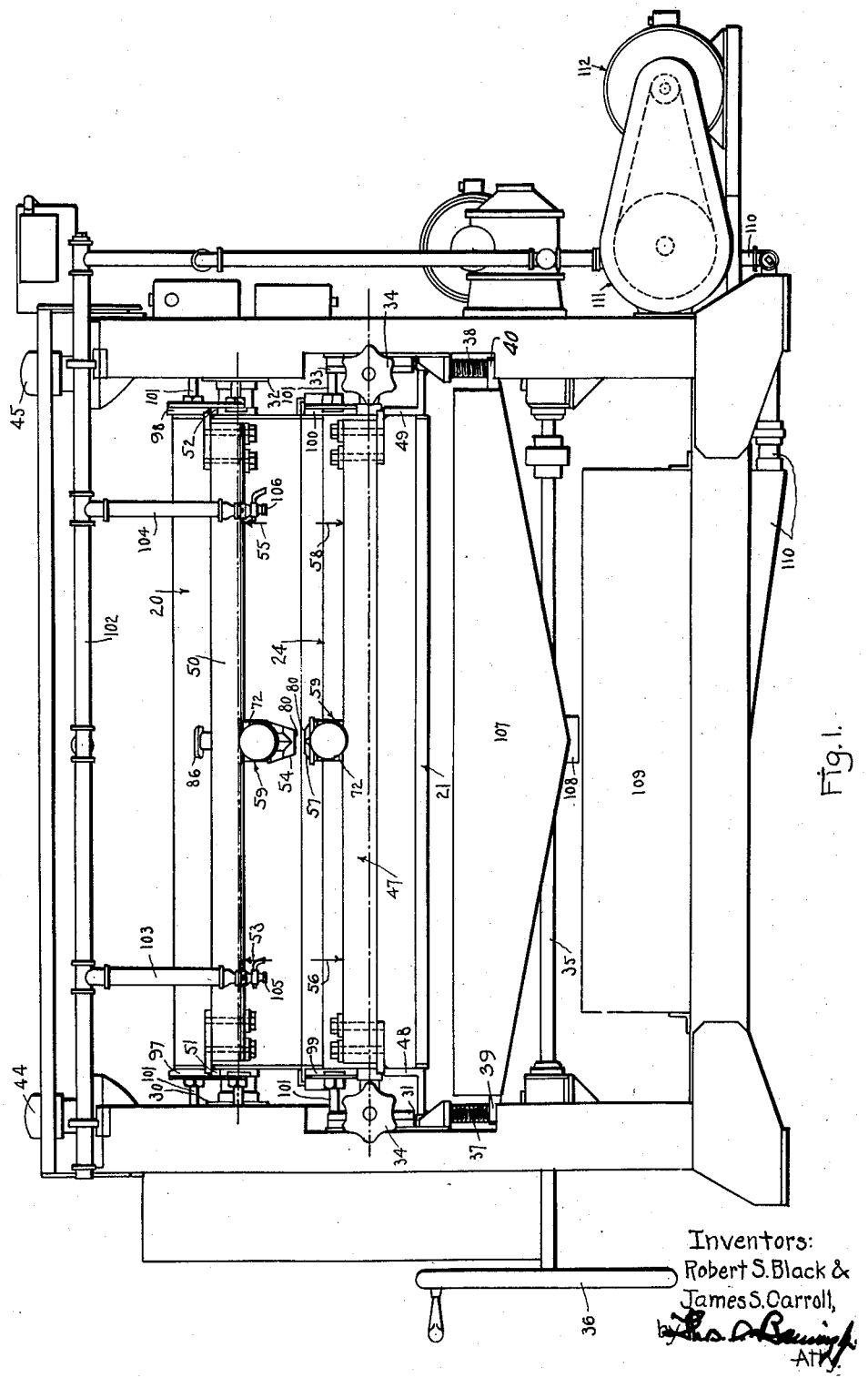
Figure 1 shows a rear elevation of a machine embodying the features of our present inventon; and this figure shows a construction in which only one stripper unit is provided to take care of the width of the sheets which may be accommodated by the machine but evidently several such units may be provided as desired.
Figure 3:
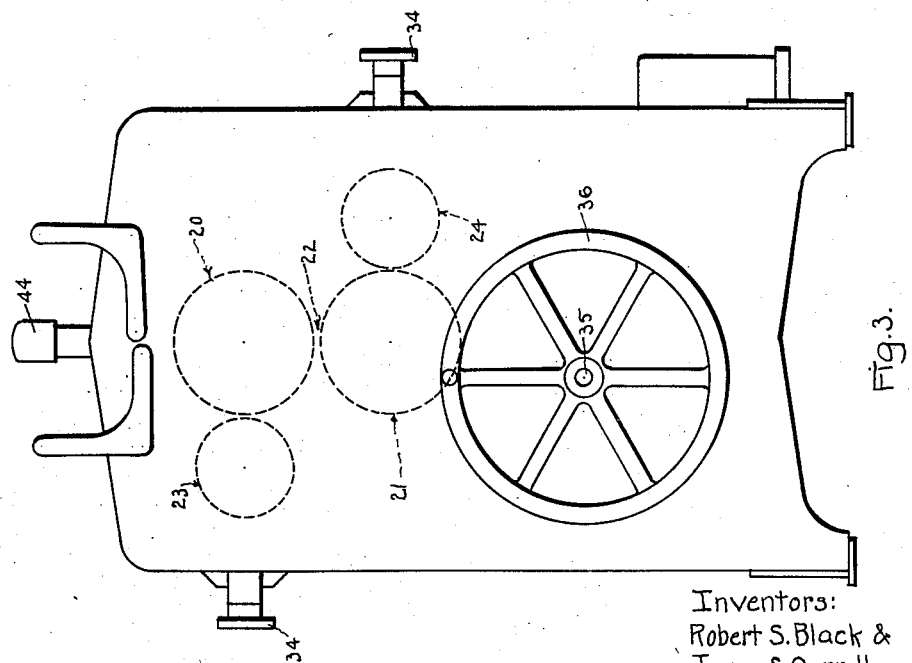
Figure 3 shows a left-hand end view corresponding to Figures 1 and 2.

In the drawings, and referring first to Figures 1, 3 and 17, the upper and lower main rolls are shown at 20 and 21, respectively. They are also shown in other figures. In Figures 3 and 17 they are shown as being separated a slight distance 22 to accommodate the thickness of stock for which they have been adjusted. As shown in Figures 3 and 17 these main rolls are located in vertical alignment. The doctor rolls for the upper and lower main rolls are shown at 23 and 24, respectively, it being here noted that the upper doctor roll is located only slightly higher than its companion main roll and in advance thereof, but that the lower doctor roll is located at somewhat lower elevation than its companion main roll and behind the said roll. Such lower elevation of this doctor roll is for the purpose of accommodating the delivery roll, presently to be described, and with ample clearance between such delivery and doctor rolls to ensure against improper transfer of adhesive between such rolls during normal operations. The delivery roll is designated as 25 in various figures.

As shown in Figures 4, 5, 6, 7 and 17, there are provided the upper and lower bracket plates 26 and 27, respectively, at the right-hand end of the device. Similar bracket plates are also provided at the left-hand end of the device as shown in Figure 17, there being designated as 28 and 29, respectively. The main rolls are journalled directly to the upper bracket plates 26 and 28 (for the main roll 20) and 27 and 29 (for the main roll 21). Doctor roll plates 30, 31, 32 and 33 are horizontally adjustably carried by the several bracket plates already referred to, such doctor roll plates being forked as shown in several of the figures to provide horizontally extending spaces within which are accommodated the journals for the doctor roll shafts, so that said journals and thus the doctor rolls themselves may be shifted horizontally with respect to their companion main rolls. Such shiftings are produced by use of the micrometer hand grip wheels 34 shown in various of the figures. By such horizontal shiftings the doctor rolls may be accurately adjusted at desired spacings from their respective main rolls, to thus accurately control the thickness of the film of adhesive which will be carried by the main rolls to the areas of application to the surfaces being treated.

It is here noted that since each doctor roll is journalled to the same bracket plates which carry its companion main roll it follows that variations in elevation of each main roll are accompanied by like variations in elevations of the doctor rolls, so that at all times each doctor roll retains its proper relation to its companion main roll.

Means are provided for shifting the elevations of the upper bracket plates for various purposes, as will presently appear. Means are also provided for shifting the elevations of the lower bracket plates to adjust the clearance between the lower and upper main rolls according to the normally operative thickness of the stock being treated. Such means is shown as including the horizontally extending shaft 35 which is suitably journalled in the end portions of the frame, and is provided with the hand wheel 36 by means of which it can be rotated to effect the desired elevational adjustments of the lower bracket plates. Such means includes a vertical threaded shaft at each end of the device, such shafts being designated as 37 and 38 for the right-hand and left-hand ends of the device, respectively. These vertical shafts appear in Figures 1 and 17. Worm and screw connections are established between the shaft 35 and both of the vertical shafts 37 and 38. Such connections are shown at 39 and 40 for the left-hand end and the right-hand end of the device, respectively. These worms are internally threaded to match the shaft threads, and the worms are retained against down movement by suitable thrust bearing arrangements. The shafts have their upper ends connected to the bracket plates and such shafts do not rotate. Accordingly, as the worms are rotated by rotation of the shaft 35 both of the shafts 37 and 38 are raised or permitted to lower by equal amounts thus correspondingly raising or permitting lowering of the bracket plates. By this means the entire lower main and doctor roll assembly is raised or lowered while retaining the horizontal condition of the main and doctor roll shafts and without disturbing the clearances between the main and doctor rolls of such assembly. It is also here noted that the delivery roll, 25, is likewise raised and lowered with such lower main roll so that the proper elevational relation between such lower main roll and such delivery roll is maintained at all times.

With the exception of the delivery roll the aforesaid earlier patent discloses structures such as just described, and such structures are herein illustrated and described in order that the novel features presently to be disclosed may be shown in their relationship thereto and combinations therewith.

Referring to Figure 17, the left-hand frame member 41 is there shown as provided with the openings 42 and 43 through which extensions of the two doctor roll shafts are carried leftwardly far enough to provide for attachment of connections to such doctor rolls to enable delivery to and return from such rolls of cooling or heating medium presently to be described in further detail. These openings are of size laterally sufficient to accommodate the maximum horizontal adjustments of the doctor rolls under control of the hand grips 34 for adjustment of the space between each doctor roll and its companion main roll. These openings are also of vertical dimension sufficient to accommodate needed vertical adjustments of such doctor rolls corresponding to vertical adjustments of the bracket plates 26, 27, 28 and 29 already referred to. We shall refer to these elements more fully hereinafter.

Figure 2:
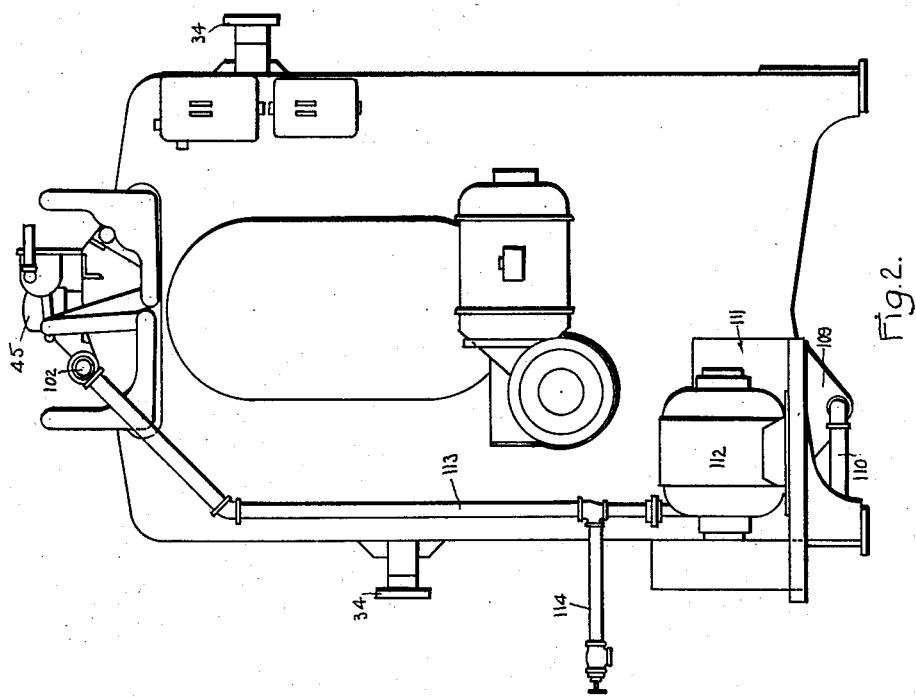
Figure 2 shows a right-hand end view corresponding to Figure 1.

In Figures 1, 2 and 3 we have shown the caps 44 and 45 above the central portions of the end frame members. These accommodate or are portions of elements by which the upper bracket plates may be permitted to shift slightly up and down to accommodate slight inequalities in the thicknesses of the sheets of stock being surface coated, when one form of construction is embodied in the structure. That form of structure is fully shown and described in the aforementioned Letters Patent of the United States, No. 2,326,429, and need not be further illustrated or described herein. In Figure 17 we have shown the cylindrical element 46 mounted on the central portion of the structure. This element comprises a portion of means to enable the upper bracket plates and the main and doctor rolls which they carry to be raised and lowered for the purpose of changing the vertical clearance between the upper and lower main rolls to accommodate stock units of different thicknesses which are being treated by the machine. Such different thicknesses may be different thicknesses of single sheets of stock and double or multiple sets of sheets, fed between the main rolls in alternation. Since these main rolls are journalled to the corresponding bracket plates which bracket plates must thus be raised and lowered, and since the doctor rolls are also journalled to such bracket plates, it is seen that provisions must be made in the construction of the machine for enabling the connections for heating or cooling medium to the upper doctor roll to rise and fall without interference with the continuity of such connections. We have made such provisions as will hereinafter appear, when the means for supply and return of the heating or cooling medium to the doctor rolls is described in detail.

We will first describe the stripper elements for both the upper and lower main rolls as follows:

A horizontally extending bar 47 (see Figures 1, 4, 5, 7, 8, 9, 10 and 11) has its ends secured to the lower bracket plates 27 and 29 by the fixtures 48 and 49 so that said bar retains an exactly fixed relation to such bracket plates and thus also to the lower main roll. Thus, as such main roll is raised and lowered this bar rises and falls in exact harmony with such main roll. Likewise a horizontally extending bar 50 (see Figures 1, 6 and 7) has its ends secured to the upper bracket plates 26 and 28 by the fixtures 51 and 52 so that said bar retains an exactly fixed relation to such bracket plates and thus also to the upper main roll. Thus, as such main roll is raised and lowered this bar rises and falls in exact harmony with such main roll. The stripper bars for the lower and upper main rolls are carried by and secured to these bars respectively so such stripper bars also rise and fall in exact harmony with their respective main rolls. Conveniently such bars comprise elements of rectangular box-like form, produced by welding together the proximate edges of companion angle bars as well shown in the cross-section of Figure 7. Thus very stiff stripper bar supporting elements are produced. This is an important ingredient of such structure since the stripper bars must be rigidly held in their adjusted positions so that the exact clearances which have been established between the stripper ends of such stripper bars and their respective main rolls will be maintained. In this connection it is noted that the lengths of the main rolls, and correspondingly the lengths of the bars 47 and 50 may be as much as eight or ten feet or more, depending on the size of the machine and the widths of the sheets which it is intended to accommodate for treatment. Very slight deflections in such bars 47 and 50 would thus entail serious displacements of the stripper bars which are intended to be set with very small clearances from their respective main rolls.

Each of the bars 47 and 50 carries at least one stripper bar depending largely on the lengths of the main rolls to which such stripper bars act. In Figure 1 we have shown only a single stripper bar for each of the main rolls. It is generally found advisable to space such stripper bars from each other by distances generally not greater than about 20 to 24 inches. In Figure 1 the stripper bar is numbered 54 for the upper main roll, and 57 for the lower main roll. The arrows numbered 53 and 55 pointing to the bar 50 and the arrows numbered 56 and 58 pointing to the bar 47 designate locations at which other stripper bars might be connected to said bars 50 and 47 respectively. Each stripper bar is connected to the corresponding supporting bar 47 or 50, as the case may be, by a fixture of such construction that such stripper bar is positioned and retained at exactly right-angled position with respect to its supporting bar and is directed towards its main roll at exactly the correct angle to ensure proper stripping action; and such fixture also includes micrometer means to enable adjustment of such stripper bar lengthwise back and forth towards and from the main rolls to enable provision of exactly the desired clearance from such main roll. These fixtures for the upper stripper bars are substantially the same as those for the lower stripper bars. Accordingly, reference will first be made to Figures 8, 9, 10 and 11 which show the detailed construction of one of the lower set of stripper bar fixtures. As shown in Figures 5, 6 and 7, the fixtures for the lower set of stripper bars are set on top of the corresponding supporting bar 47, whereas the fixtures for the upper set of stripper bars are set against the bottom of the corresponding supporting bar 50. Thus the several stripper bars themselves are brought into best relationship to the main rolls which they serve.

Each fixture includes a U-shaped frame element 59 formed from the base block 60 and the front and back vertical blocks 61 and 62, respectively. These front and back blocks are conveniently welded to the base block for rigidity of structure. The horizontally extending rods 63 and 64 are supported by these front and back blocks in exact parallelism and above the top face of the base block as well shown in Figures 8, 9, 10 and 11. These rods are retained in place by the set screws 65 and 66 shown in Figure 8. A slide block 67 is nicely set onto these rods with its bottom surface slightly above the top face of the base block so that complete freedom of movement of such slide block is assured. This slide block is of less horizontal dimension from front to rear than the clearance between the proximate surfaces of the front and back blocks 61 and 62, so that back and forth horizontal movements or adjustments of such slide block may be executed. Due to the lateral separation of the two rods 63 and 64 from each other the slide block is retained accurately against any rock about an axis extending from front to rear of the machine. A screw element 68 extends from front to rear through the space between the space between the front and back blocks 61 and 62, and is threaded through the slide block as well shown in Figures 9, 10 and 11. The rear end 69 of this screw element is enlarged slightly to meet the full diameter of the threads on such screw element so that when such screw element is set into place through the front and back blocks such operation may be executed from back to front. The screw element 68 is also shouldered at 70 to provide a forwardly facing abutment which bears against the back face of the front block 61 when the parts are assembled. The reduced diameter forwardly extending stem 71 thus produced extends through the front block 61 to receive the hand grip 72 having the hub portion 73 which seats onto the stem 71. It is desired that the screw element 68 be effectively retained against shift forwardly or backwardly with respect to the frame element 59. To this end we have provided the two set screws 74 and 75 extended through the hub portion 73, and preferably located at opposite sides of such hub portion as shown in Figure 10. These set screws enter into the V-shaped bores 76 and 77, respectively, the ends of the screws being V-pointed to seat into such bores. Examination of Figure 10 shows that these bores are off-set lengthwise of the stem 71 so that both of the set screws cannot be fully threaded to the bottoms of their respective bores at the same time. Thus, with the parts in the relative positions shown in Figure 10 the tendency of the screw 74 is to shift the stem 71 rightwardly, while the tendency of the screw 75 is to shift such stem leftwardly. Thus the two screws act in opposition, and by threading one screw slightly out and correspondingly threading the other screw slightly in the hub may be brought to exact adjustment on the stem, and then locked at such adjustment by tightening both screws equally. By this means the hub 73 of the hand grip may be adjusted for nice clearance with respect to the righthand end block 61, the shoulder 70 of the screw bearing against such end block. Thus the parts may be brought to a condition of minimum tolerance between the stem and the end block while at the same time allowing free rotation of the stem. However, it is also noted that the screws may be so adjusted that by tightening the screw 74 the hub 73 may be forced tight against the end block 61, drawing the shoulder 70 against the inside face of such end block, and thus locking the threaded stem against rotation and with its shoulder 70 tight against the end block. Thus there is assurance that no shift of the slide block 67 can occur, such slide block having been first brought to exact position forwardly or backwardly as desired by rotation of the hand grip 72 by the operator.

The stripper bar (57 being the one illustrated in Figures 8, 9, 10 and 11), comprises a very stiff substantially straight bar (with the exception of its roll end), formed to perform its functions to a high degree of accuracy and dependability. In the embodiment shown in the figures it comprises the longitudinal strap 78, slightly tapered from front to back as shown in Figures 4 and 8, and having its back end portion bent up (or down, as the case may be) as well shown in Figure 9 to produce the spatula-like end section 79 which approaches the roll in a direction substantially tangent to its curvature. It is to be noted that these main rolls are generally surfaced with rubber or neoprene or other like material of yieldable nature, and are also frequently provided with encircling grooves or a groove spiralling on an almost imperceptible spiral angle, such arrangement being disclosed in Letters Patent of the United States, No. 2,343,363, issued March 7, 1944 on the application of John E. Black and Robert S. Black. Experience has shown that in time it becomes necessary or desirable to refinish or even to re-surface these main rolls, and during the expected life of such a roll prior to such re-finishing or resurfacing some diminution of size occurs, the surface diameter being slightly reduced by wear or otherwise. However, such expected changes in main roll diameter are quite small, proportionately to their original diameters, and accordingly, it has been found that by originally setting the stripper bars so that these end spatula-like portions are substantially tangent to the roll's surface, or by setting the stripper bars so that such spatula-like portions, projected, would slightly intersect the arc of the roll's surface, it is unnecessary to make provision for changing the angle of the stripper bars when once installed or adjusted on the carrier bars 47 (or 50, as the case may be).

The extreme end of such spatula-like portion provides the straight edge 80 extending at right angles to the length of the stripper bar and parallel to the axis of the roll. This edge is beveled outwardly from the roll's surface as shown in Figure 9, but preferably a sharp edge is to be avoided, as shown in said figure. By provision of such straight line edge instead of bringing the end of the bar to a point, a substantial line of discreet length is presented to the oncoming edge of the stock riding on the roll, so that the force needed to effect stripping is distributed instead of being concentrated at a single point. This is a very important feature of our present form of stripper since tendency to shread or tear the leading edge of the sheet coming from the roll is thus avoided.

The strap 78 is of itself of substantial stiffness but we have reinforced it by provision of the V-shaped bar 81 which is provided with the edge flanges 82 and 83 so formed that they lie flat against the surface of the bar or strap 78, as well shown in Figure 11. Such flanges may be spot welded to the strap 78 to ensure great stiffness of the completed stripper bar. It is noted, as well shown in Figures 8 and 9, that the apex of the V of such bar 81 continues rearward until it intersects the surface of the spatula portion 79. This result is produced by terminating the flanges 82 and 83 substantially at the line of bend 84 where the spatula begins, and cutting the two sides of the V on angles such that the exposed edges thus produced will come just to the surface of the spatula, to which surface they may be spot welded if necessary.

The unit including the U-shaped element 59 and the stripper bar and associated parts, is secured to the bar 47 (or 50, as the case may be), such attachment being so effected that the element 59 together with the stripper bar be readily removed from such bar 47 (or 50), and afterwards replaced thereon with assurance that during such replacement the stripper bar will be properly co-ordinated with the roll and other parts, and without the need of again re-adjusting or co-ordinating the parts. The attachment of the unit 59 to the bar 47 (or 50) is effected as follows:

A threaded stem 85 is extended up (or down, as the case may be) through the supporting bar 47 (or 50) and into the block 60 of the unit 59. This stem 85 has the hand grip 86 secured to its lower end whereby it may be readily rotated, until the shoulder 87 of the hub 88 comes to bear against the bottom surface of the bar 47. Tightening of the stem will then ensure tightness of the unit 59 against the top surface of the bar 47. In order to ensure correct directional placement of the stripper bar during such restoration to the supporting bar 47, we have provided the dowel pins 89 and 90 secured to the base block 60 and adapted to register with corresponding holes provided in the top of the supporting bar. By setting the unit 59 into place on the supporting bar with the dowel pins and holes in register assurance is had that the stripper bar will be pointed in exactly the right direction to bring its stripping edge 80 parallel to the axis of the roll. In order to prevent the stem 85 and hand grip 86 from dropping away from the supporting bar when such stem is unthreaded from the unit 59 we have provided a pin 91 extending through the stem 85 in such position that when the stem is unthreaded from the unit 59 such stem cannot fall far enough to bring its upper end through the top surface of the supporting bar. Thus the stem is always ready and positioned to be re-threaded up into the base block 60 when a re-assembling operation is to be performed. Holes 92 and 93 are provided in the sides of the supporting bar in position to enable insertion of such 91 through the stem 85. Conveniently the attachment of the stripper bar to the slide bar 67 is effected by means of screws 94 as shown in Figure 8.

Next we consider the arrangements herein disclosed for enabling control of the temperatures of the adhesive and ensuring that such temperatures are best for operation under the prevailing conditions of specifications of such adhesive, rate of travel of the sheet stock between the main rolls, surface conditions of such sheets of stock, and other factors. We have referred to the supply of the adhesive to the crotch between the main rolls and their companion doctor rolls. As the operations proceed the adhesive contained in each of these crotches (between the upper main and doctor rolls, and between the lower main and doctor rolls) diminishes due to application of such adhesive to the sheet surfaces and also by return of a portion of the film carried by both the main rolls and the doctor rolls to the system, not having been completely taken up by the surfaces of the sheets. Nevertheless it is necessary to replenish the adhesive contained in each crotch either continuously or intermittently as the work progresses. Some adhesive will drip down from the surfaces being treated and must be disposed of either as wastage or by return to the system.

Referring first to Figures 1, 4, 5, 6, 7 and 17, we have in several of these figures shown the crotches 95 and 96 between the upper and lower pairs of rolls, the directions of roll rotation being downwardly at each crotch. We have also shown the end plates 97 and 98 supported against the ends of the upper rolls to close the ends of the crotch 95, and the end plates 99 and 100 supported against the ends of the lower rolls to close the ends of the crotch 96. These end plates are supported from the adjacent bracket plates by adjustment studs and nuts as shown at 101 in various of the figures so that the end plates may be retained against the roll ends in sealing engagement therewith. These end plates are formed with cam surfaces at their ends so that as the rolls rotate the engagements of the roll ends with the end plate surfaces will not be abrupt but with a rather gradual engagement, thus avoiding any tendency to snag the parts together, and ensuring a more perfect area of contact and seal. End plates of this type are shown in the aforementioned Letters Patent of the United States, No. 2,326,429, and it is not deemed necessary to here describe them in further detail. It is now noted, however, that in that earlier patent there was made no provision for permitting any overflow of adhesive from the crotches produced between the pairs of rolls and such end plates, so that the only circulation of adhesive possible with such earlier arrangement was that to replenish the adhesive as consumed or leaked from the crotches themselves during normal running and take-up by the surfaces of the treated sheets of stock.

In Figures 1, 2 and 17 we have shown a manifold 102 extending along the length of the machine in its upper portion, and from which there depend supply pipes 103 and 104 towards the crotch between the upper pair of rolls. Control valves and spouts 105 and 106 are provided in these pipes to enable adjustment of the rate of delivery of adhesive into the upper crotch to meet continuing needs of adhesive, and to maintain the level of adhesive in such crotch substantially constant. Similar provisions of pipes and control valves and spouts may also be provided for supply of adhesive to the lower crotch if desired.

Below the lower pair of rolls there is shown the large pan 107 conveniently supported by the end frame members of the machine as well shown in Figure 1. This pan is of size sufficient to collect any adhesive dripping from the rolls or from the sheets being treated, to collect the same and avoid undesirable drippage of such material onto the floor. The floor of this pan preferably slants to a central delivery spout 108 from which the collected material may be continuously or intermittently delivered to a lower pan 109. From this lower pan there extends a delivery connection 110 running to a pump 111 (see Figure 2) driven by a motor 112. Thus the material collecting in the lower pan may be either continuously or intermittently delivered through a line 113 to the manifold 102. A lateral connection 114 leading into the line 113 serves for supply of additional adhesive into the system, and such supply may be at such rate as to substantially equal the rate of consumption of adhesive.

In Figure 7 we have shown the openings 115 and 116 in the end plates 97 and 99, such openings being located at the level at which it is desired that overflow of adhesive from the crotches shall occur. A pipe 117 connects to both of these overflow openings and delivers return adhesive to a common point. As shown in Figures 4 and 19 this pipe delivers such overflow down into the pan 107 where it will collect together with other adhesive coming into such pan. (In Figure 19 we have shown only one of the crotches for purposes of simplicity in illustration.) By means of this arrangement it is possible to supply the adhesive to the crotches at rate greater than the normal consumption by application to the surfaces being treated. Due to this fact it is also possible to enable close temperature controls of the adhesive being applied to the surfaces, as will hereinafter be evident. We have thus herein provided means to enable a continuous circulation of the adhesive, with provision of means to enable replenishment of such adhesive at rate to maintain the circulating system constantly properly filled.

Next attention is directed to Figures 12, 13, 14, 15 and 16 which show a typical doctor roll together with means to permit introduction of cooling or heating medium thereinto and circulation of such medium through such doctor roll and exit therefrom to enable continuous circulation. The typical doctor roll construction includes a tubular section 118 to which are welded or otherwise secured in fluid tight manner the end heads 119 and 120. In Figure 12 we have shown means to enable introduction of the medium into the right-hand end of the doctor roll and exit of such medium from the same end. In Figure 13 we have shown means to enable introduction of the medium into the right-hand end of the doctor roll and exit of such medium from the left-hand end. The schematic or diagrammatic showing of Figure 19 is based on the latter type of circulation of the medium through the doctor roll, but this is done merely as a matter of convenience in illustration and not as a matter of limitation.

The tubular shaft extension 121 extends from the right-hand end head 119 of Figure 12, being provided with the bore 122 throughout its length. The shaft extension 123 extends from the left-hand end head 120 of Figure 12, the same not being provided with a through bore. These shaft extensions are properly journalled in the manners already explained, being carried by journals in the forked plates which are back and forth adjustable in the bracket plates.

A fixture 124 is secured to the right-hand end of the shaft extension 121, such fixture being shown on larger scale in Figures 14, 15 and 16. It includes the tubular body element 125 having the through bore 126, and the nipple 127 which is threaded into the end of the shaft extension 121. Thus this body element 125 rotates with the shaft extension and thus with the doctor roll. A stationary tubular body element 128 receives the right-hand portion of such element 125 with a nice fit. This element 128 is provided with a rightwardly extending bore 129 which conveniently is stepped in size, including the large left-hand end bore section 129ª, the central bore section 129ᵇ, and the right-hand bore section 129ᶜ, terminating at the partition 130. This partition is of size to nicely receive the end portion of the element 125 in a substantially liquid tight manner, but it is here noted that since the differential of pressures at the two faces of such partition is small, depending on the pressure at which the medium is delivered to the unit, minus a further sealing action presently to be explained.

Beyond the partition 130 the stationary element 128 is provided with the chamber 131 into which chamber the end of the bore 126 connects. This chamber 131 is provided with the lateral connection 132. The extreme right-hand end of this chamber is provided with a threaded opening 133 into which the end of a tube 134 is threaded. The extreme right-hand end of the fixture is then provided with the threaded opening 135 into which a circulation tube or pipe may be connected (not shown in Figure 14). Generally the opening 135 is connected to the supply connection of the circulating medium, and the opening 132 is connected to the delivery or return connection of the system.

The tube 134 is sufficiently smaller than the bore 126 of the element 125 to allow such tube to be carried through such bore and through the shaft extension 121 and through the length of the doctor roll to a location close to the opposite end head 120, leaving an annular passage 136 within the bore 126 and the bore 122 of the shaft extension 121, so that the liquid or other medium may return through such annular passage to the chamber 131, and thence to the connection 132. Accordingly water or other medium introduced through the connection 135 will flow to the far end of the interior of the doctor roll, be there delivered into the large interior diameter of such doctor roll, and travel slowly rightwardly to the annular passage 136 and be finally discharged through the connection 132.

Suitable packing elements 137, 138 and 139 are provided to seal against leakage of the medium at the left-hand end of the element 128, and a drain connection 140 is provided for receiving such small amount of leakage as passes the packings 137 and 138 for delivery to waste or other disposal. If desired oil or other lubricant may be introduced through this passage to lubricate the rotating contact elements, it being understood that the element 125 rotates at doctor roll speed which is comparatively low.

As a modification of the fixture just described in which the medium is delivered to the far end of the doctor roll and returns for discharge at the same fixture as introduces it into the doctor roll, attention is directed to Figure 13 in which a similar fixture is provided which, however, is not used in connection with the interior tube to deliver the medium to the far end of the doctor roll. In this modification the medium is introduced into the right-hand end of the doctor roll, travels the length of the doctor roll, and is discharged from the left-hand end of the doctor roll. In this case the tube 134 is dispensed with, and the left-hand bearing element is hollow to provide for discharge of the medium. It is not believed necessary to describe this modification in full detail in the light of the description given with reference to Figure 14.

In Figures 17 and 18 we have shown the inlet manifold 141 connected to the inlet ends of both of the fixtures 124ª and 124ᵇ for the upper and lower doctor rolls, respectively. These connections include the flexible sections 141ª and 141ᵇ, respectively formed of rubber hose or the like, and providing the necessary flexibility to allow for up and down movements of the doctor rolls while the manifold 141 remains stationary. We have also in said figures shown the discharge manifold 142 connected to the discharge connections of both of the fixtures 124ª and 124ᵇ for the two doctor rolls, and including the flexible sections 142ª and 142ᵇ which also provide for the up and down movements of the doctor rolls while the manifold 142 remains stationary. Thus we have made provision for introduction and discharge of currents of water or other heat transferring medium to and from both doctor rolls. The simple arrangement for supplying cooling water to the doctor rolls, for example, would include simple connections to the manifold 141 with valve arrangements to control the rate of water input, and with a return discharge connection to the manifold permitting either re-circulation of the discharged water or delivery thereof to waste. We have, however, disclosed herein means to control the cooling or heating effect of the medium for maintaining a desired temperature of the adhesive under work conditions, and have also disclosed means to effect these results automatically if desired. Reference is therefore made to Figure 19 as follows:

In Figure 19 we have shown schematically the lower main and doctor rolls 21 and 24 providing the crotch 96 between them, the end plates 99 and 100 for closing the ends of such crotch, the delivery pipe 117 for delivery of overflow medium from the crotch to the pan 107, the inlet or supply connection 141 for delivery of medium to one end of the doctor roll, and the delivery connection for carrying away the medium from such doctor roll. We have also shown the return connection 110 from the pan 107 for returning adhesive from such pan to the adhesive pump 111, and the adhesive delivery pipe 113 delivering adhesive to the crotch under control of the spout and valve device 105. It is noted that in this schematic showing we have, for convenience of illustration only, shown the arrangement in which the medium is introduced into one end of the doctor roll and is discharged from the other end thereof, but evidently, as will presently appear, the single end arrangement such as shown in Figures 12 and 14 could be used in place of the double end arrangement illustrated, as far as the system of circulation now to be described is concerned. It is also noted that in such schematic showing we have illustrated only the lower main and doctor rolls and elements related thereto. This, too, is done for simplicity of illustration, only.

We have, in Figure 19, shown a heating unit 143 for the medium and a cooling unit 144 for such medium, whereby the system may be used for either heating or cooling the doctor rolls, according to the requirements of the adhesive being used, and other factors of the operation. As will presently appear either the one or the other of these units may be eliminated in a given installation according to the needs of the installation. Each of these heat producing or controlling units includes a heat transfer section, conveniently shown as the containers 145 and 146 through which the medium flows. Thus a body of such medium is always present in such containers. The heating unit 143 is provided with a heating element 147 for electrical heating under proper control, and the cooling unit 144 is provided with a cooling coil 148 through which cooling medium may be circulated, such cooling medium being supplied through one connection 149 and discharged through another connection 150. For simplicity of illustration the conduits for the medium are shown as passing through both the heating and cooling units in series, it being understood that either the one or the other operation, heating or cooling, is to be performed at any given time. Thus the discharge pipe 142 from the doctor roll connects to the heat transfer element 153 within the unit 143, and such heat transfer element 153 connects to the inlet connection of the unit 144 by the pipe 154. The delivery from the cooling unit is effected through the connection 155 reaching to the bottom of the unit 144 or close to such bottom. The partition 156 serves to ensure desired flow of the medium around the cooling coil 148 for more complete heat transfer. The connection 155 connects to the pipe 141 already referred to. A circulating pump 157 is located in the pipe 141 to ensure desired flow of the medium through the system. Conveniently such pump is of the centrifugal type so that variations of rate of fluid flow may be obtained by valve control and without need of changing the rate of pump operation.

We have also shown means to heat or supply heat units to the adhesive itself during the operations. Usually the adhesive will be delivered from a separate mixer or adhesive preparing unit to the surface coater and at desired temperature; but for purposes of completeness of the showing we have included means to transfer heat to the adhesive during its circulation directly from a controlled heating unit, and additional to the heating effects produced by the doctor rolls when such rolls are themselves heated instead of being cooled. It will be understood that this special heating means for the circulating adhesive may or may not be included in an installation according to the requirements of such installation. Such adhesive heating unit is shown at 158 in Figure 19.

The heating unit 158 includes a container 159 into which the adhesive is delivered by the return line 110, the delivery line 113 connecting to the pipe 160 reaching close to the bottom of the container. Preferably a baffle 161 is provided in the container to throw the flowing adhesive over against the heating element 162, shown as comprising an electrical heating coil. It is intended that the container 159 shall normally operate well filled so that good circulation of the adhesive shall occur.

In the line 142 through which the medium returns to the units 143 and 144 we have indicated a thermostatically operated valve 163ª for controlling the rate of flow of the medium through the medium circulating system when a closed circuit system is used. In case the delivery of medium from the doctor roll should be to a waste connection the medium delivered from such valve 163ª would be delivered to waste instead of to the units 143 and 144; but the rate of movement of such medium through the doctor rolls would nevertheless be controlled by such valve.

In order to control the heating effects produced by the units 147 and 162 we have indicated means to control the amount of current flowing through each of such elements by control of the voltage delivered thereto. To this end the following elements are shown: A transformer 163 having the primary 164 and the tapped secondary 165 is provided for the heating element 147, and a transformer 166 having the primary 167 and the tapped secondary 168 is provided for the heating element 162. The primaries of both transformers are supplied with current at substantially constant voltage under control of the main switches 169 and 170 for the two transformers, respectively. The movable contact 171 for the tapped secondary 165 is carried by the arm pivoted at 172 and insulated from such arm, a flexible lead 173 connecting from such movable contact to one end of the heating element 147. By this arrangement the voltage delivered to such heating element is changed by shift of the arm on such pivotal point. The other end of such arm is connected to the diaphragm of the vapor pressure operated element 174 so that as the vapor pressure rises or falls the arm is correspondingly rocked clockwise or counterclockwise as the case may be. The arrangement is such that lowering of vapor pressure will result in increase of voltage delivered to the heating element with corresponding increase of heating effect, and that rising of the vapor pressure will result in decrease of voltage delivered to the heating element with corresponding decrease of heating effect. Thus the tendency will be to retain the vapor pressure at a constant pre-determined or pre-set amount corresponding to a pre-determined or pre-set temperature. A similar voltage control arrangement is shown for controlling the heating effect produced by the heating element 162 of the unit 158, such voltage control arrangement including the elements 171ª, 172ª, 173ª and 174ª, corresponding to like numbered elements of the previously described unit.

All three of the elements 163ª, 174 and 174ª are to be thermostatically controlled by vapor pressure produced by the temperature existing at the point of test. We have indicated the thermostatic vapor pressure producing elements 175 and 176, the former in the line 141 which supplies the medium to the doctor rolls and the latter in the line 113 which supplies the adhesives to the crotches between the rolls. Thus the element 176 will act at all times according to the temperature of the adhesive being supplied to the point of use, and the element 175 will act at all times according to the temperature of the medium being delivered to the doctor rolls.

A vapor line 177 connects the elements 175 and 176 together, but valves 178, 179 and 180 are located at points along such vapor line so as to make posible the subdivision of such line into four sections, conveniently designated as 177ª, 177ᵇ, 177ᶜ and 177ᵈ, respectively. Branch lines 181 and 182 extend from the sections 177ᵇ and 177ᶜ to the thermostatically operated elements 163ª and 174, respectively, and valves 183 and 184 are located in these branch lines. A vapor line 185 also extends from the element 176 to the element 174ª, and a valve 186 is included in this vapor line. With these arrangements various operating combinations may be effected which will be apparent to the student of such control elements, but certain of such operating combinations are as follows:

First it is noted that the sole function of the thermostatic control 174ª is to effect direct control of the temperature of the adhesive since that element is controlled, when the valve 186 is open, solely by the element 176 which is under the sole control of the temperature of the adhesive flowing to the rolls. Any rise of that temperature will promptly produce lessening of the heat output of the element 162; and falling of that temperature will promptly increase the heat output of the element 162. Thus the effect is always to produce a compensating action, to hold the temperature of the adhesive at that degree to which the control units have been set. Controls of this kind are well and widely known in the arts, so it is not believed necessary to illustrate and describe the details of construction of the units 175 and 176, which include manually adustable thermostatic elements which may be pre-set to the temperatures which it is desired to maintain through the medium of such controls.

Second it is noted that the heat transferring ability of the circulating medium, being circulated through the doctor rolls, depends both on the rate of flow of such medium measured in gallons or other units of volume per unit time, and on the temperature differential between such medium as it flows through the doctor rolls and the film of adhesive carried by the surfaces of such rolls. Such heat transfer may be either from the adhesive to the circulating medium (a cooling effect) or from the circulating medium to the adhesive (a heating effect). When the effect is to be one of cooling, reliance can usually be placed on the temperature of available water from the usual service mains to produce a sufficient cooling effect, and for this reason we have not indicated any special refrigerating element in connection with the cooling coil 148 shown in Figure 19. However, we have shown the thermostatically operated and controlled valve unit 163ª in the line of circulation so that the cooling effects of the medium may be controlled by change of volume or rate of flow thereof. When a heating effect is to be produced in the circulating medium such result may be secured by the heating element 147 and controls therefor, already referred to.

Usually when a cooling effect is to be produced it will be desirable or sufficient to effect control of the valve 163ª by use of the thermostatic element 175 which may then be set to maintain a pre-selected temperature of the circulating water or other medium. When the available service water is used through the coil 148 the rate of flow of such water through such coil will be set to that value which is believed to be ample to produce the needed heat dissipating capacity, and the thermostatic unit 175 will be set to maintain that temperature of the circulating medium which experience has determined will be proper to produce the desired control of roll temperature. Then, either of two control effects may be produced. By opening the valves 178 and 183 and closing the valve 179 the operation of the valve 163 will be determined by the temperature of the circulating medium being delivered to the doctor rolls, to maintain that temperature at the value pre-set by the operator. Thus control of rate of flow of the circulating medium will produce the desired end effect, namely, delivery of the circulating medium at the desired temperature to the rolls. On the contrary, if desired the control of the valve 163ª may be effected directly by the setting of the thermostatic unit 176 which acts according to the temperature of the adhesive being delivered to the rolls. This result may be secured by closing the valves 178 and 184 and opening the valves 183, 179 and 180 so that only the valve unit 163ª is now brought under control of the thermostatic unit 176, the thermostatic unit 175 being now isolated.

When a heating effect is to be produced, either to maintain and closely control the high temperature of the adhesive being supplied to the machine, or to actually raise the temperature of the adhesive above that temperature at which it is supplied, the cooling element 148 will be shut off so that the medium, whether water or oil or other liquid having a boiling point sufficiently high to meet the requirements of the operation, will merely flow through the unit 144. Then the volume or rate of flow of such medium may be controlled as already explained by operation of the valve 163ª, or the addition of heat to such medium to raise its temperature may be effected by the unit 147, or both of such operations may be effected. Also, various combinations or alternative arrangements may be effected by opening selected valves and closing other valves of the group 178, 179, 180, 183 and 184. Thus a very wide range of operations is available, with automatic controls of rate of flow of the circulating medium and of the temperature of the adhesive itself.

We claim:

1. In a roll type surface coater, the combination of a main roll, a vertically movable bracket plate adjacent to each end of the main roll, means to journal the main roll to said bracket plates, means to rotate the main roll in a predetermined direction of rotation, means to urge a substantially horizontal sheet of stock to be coated against the surface of the main roll along a narrow zone of coating contact with the main roll, means to supply coating material to the surface of the main roll at an area of said surface in advance of said zone of contact, and means to strip the sheet of stock from the main roll at a location in proximity to the zone of coating contact of the sheet with said roll and at the delivery side of said zone of contact, comprising a stiff stripper bar having a straight stripper edge extending in direction normal to the length of said bar, a supporting bar extending parallel to the axis of the main roll, means to support the ends of said supporting bar on the bracket plates, and means to secure the stripper bar with its stripper end edge in close proximity to and separated from the surface of the main roll at said stock stripping location, and with the stripper bar lying in direction substantially tangent to the arc of the main roll at said location.

2. Means as defined in claim 1, wherein the stripper bar is supported on the supporting bar with said end edge substantially parallel to the axis of the main roll.

3. Means as defined in claim 1, wherein the stripper bar includes a sheet metal strip having its stripper end edge portion formed at an angle to the body portion of said strip and comprising that portion which lies substantially tangent to the arc of the main roll.

4. Means as defined in claim 1, together with means to shift the stripper bar with respect to the supporting bar endwise of said stripper bar and parallel to its length to adjust the amount of separation of said stripper end edge from the surface of the main roll.

5. Means as defined in claim 4, wherein the means to shift the stripper bar endwise comprises a portion of the means to secure the stripper bar to the supporting bar.

6. Means as defined in claim 5, together with means to lock the stripper bar with respect to the supporting bar in such adjusted position.

7. In a roll type surface coater, the combination of a main roll, a vertically movable bracket plate adjacent to each end of the main roll, means to journal the main roll to said bracket plates, means to rotate the main roll in a predetermined direction of rotation, means to urge a substantially horizontal sheet of stock to be coated against the surface of the main roll along a narrow zone of coating contact with the main roll, means to supply coating material to the surface of the main roll at an area of said surface in advance of said zone of contact, and means to strip the sheet of stock from the main roll at a location in proximity to the zone of coating contact of the sheet with said roll and at the delivery side of said zone of contact, comprising a stiff stripper bar having a straight stripper edge extending in direction normal to the length of said bar, a supporting bar extending parallel to the axis of the main roll, means to support the ends of said supporting bar on the bracket plates, and means to secure the stripper bar with its stripper end edge in close proximity to and separated from the surface of the main roll at said stock stripping location, and with the stripper bar lying in direction substantially tangent to the arc of the main roll at said location, said securing means including a U-shaped body member having end flanges and a floor, means to secure said body member to the supporting bar with the end flanges of said U-shaped body member lying substantially parallel to the supporting bar and at different distances from the main roll, a pair of supporting rods extending between the end flanges of the body member and separated from the floor of such body member, a slide block slidably mounted on said rods and movable towards and from the main roll, and means to secure the stripper bar to said slide block.

8. Means as defined in claim 7, together with means to shift the slide block on said supporting rods towards and from the main roll.

9. Means as defined in claim 8, wherein said shifting means comprises a screw element extending parallel to the supporting rods and journalled in the end flanges, together with means to lock said parts in adjusted position.

10. In a roll type surface coater, the combination of a main roll, a doctor roll parallel thereto and in surface proximity to said main roll, means to journal both of said rolls in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, and means to control the temperature of coating material so supplied to said crotch, wherein the means to control the temperature of the coating material so supplied to said crotch includes means to supply heat units to the coating material in advance of entry of such material into said crotch, together with means to control the rate of supply of said heat units to said coating material, together with means to supply heat units to the doctor roll.

11. Means as defined in claim 10, together with means to control the rate of supply of said heat units to the doctor roll.

12. In a roll type surface coater, the combination of a main roll, a doctor roll parallel thereto and in surface proximity to said main roll, means to journal both of said rolls, in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, and means to control the temperature of coating material so supplied to said crotch, wherein the means to control the temperature of the coating material so supplied to said crotch includes means to withdraw heat units from the coating material in advance of entry of such material into said crotch, together with means to control the rate of removal of said heat units from said coating material, together with means to withdraw heat units from the doctor roll.

13. Means as defined in claim 12, together with means to control the rate of withdrawal of said heat units from the doctor roll.

14. In a roll type surface coater, the combination of a main roll, a doctor roll parallel thereto and in surface proximity to said main roll, means to journal both of said rolls, in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, and means to control the temperature of coating material so supplied to said crotch, wherein the means to control the temperature of the coating material so supplied to said crotch includes means to supply heat units to the doctor roll or to withdraw heat units from said doctor roll, selectively, together with means to control the rate of supply of heat units to the doctor roll or to control the rate of withdrawal of heat units from the doctor roll, selectively.

15. In a roll type surface coater, the combination of a main roll, a doctor roll parallel thereto and in surface proximity to said main roll, means to journal both of said rolls in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, together with temperature responsive control means in connection with the means to supply the coating material to the crotch, means to supply heat units to the doctor roll, means to vary the rate of supply of the heat units to the doctor roll, and operative connections between the temperature responsive means aforesaid and the means to vary the rate of supply of the heat units to the doctor roll.

16. Means as defined in claim 15, wherein the means to vary the rate of supply of the heat units to the doctor roll, and the temperature responsive control means, and the operative connections between said parts, are constituted to vary the rate of supply of the heat units to the doctor roll inversely as the variation of the temperature of the coating material supplied to the crotch.

17. In a roll type surface coater, the combination of a main roll, a doctor roll parallel thereto and in surface proximity to said main roll, means to journal both of said rolls in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, together with temperature responsive control means in connection with the means to supply the coating material to the crotch, means to withdraw heat units from the doctor roll, means to vary the rate of withdrawal of heat units from the doctor roll, and operative connections between the temperature responsive means aforesaid and the means to vary the rate of withdrawal of the heat units from the doctor roll.

18. Means as defined in claim 17, wherein the means to vary the rate of withdrawal of the heat units from the doctor roll, and the temperature responsive control means, and the operative connections between said parts, are constituted to vary the rate of withdrawal of the heat units from the doctor roll inversely as the variation of the temperature of the coating material supplied to the crotch.

19. In a roll type surface coater, the combination of a main roll, a doctor roll parallel thereto and in surface proximity to said main roll, means to journal both of said rolls in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, temperature responsive control means in connection with the means to supply the coating material to the crotch, means to vary the temperature of the doctor roll, said temperature varying means including means to supply heat units to the doctor roll, means to vary the rate of supply of the heat units to the doctor roll, and operative connections between the temperature responsive means aforesaid and the means to vary the rate of supply of the heat units to the doctor roll.

20. Means as defined in claim 19, wherein the means to vary the rate of supply of the heat units to the doctor roll, and the temperature responsive control means, and the operative connections between said parts, are constituted to vary the rate of supply of the heat units to the doctor roll inversely as the variation of the temperature of the coating material supplied to the crotch.

21. In a roll type surface coater, the combination of a main roll, a doctor roll parallel thereto and in surface proximity to said main roll, means to journal both of said rolls in substantially horizontal alignment and with the cylindrical surfaces of the rolls spaced apart to provide a narrow coating material supply opening between the rolls and extending parallel to the rolls, there being an upwardly facing V-shaped coating material supply crotch between the rolls and the narrow coating material supply opening being in communication with the bottom of said crotch, crotch end walls in engagement with the ends of the main and doctor rolls, means to urge a substantially horizontal sheet of stock to be coated against the surface of the main roll along a narrow zone of coating contact with the main roll and to support the sheet of stock in contact with the surface of the main roll and free of contact with the doctor roll, means to rotate both the main roll and the doctor roll in their journals in direction of surface travel of the cylindrical surface of the main roll downwardly at the location of the narrow coating material supply opening and away from such supply opening, means to supply coating material to said crotch, temperature responsive control means in connection with the means to supply the coating material to the crotch, means to vary the temperature of the doctor roll, said temperature varying means including means to withdraw heat units from the doctor roll, means to vary the rate of withdrawal of heat units from the doctor roll, and operative connections between the temperature responsive means aforesaid and the means to vary the rate of withdrawal of the heat units from the doctor roll.

22. Means as defined in claim 21, wherein the means to vary the rate of withdrawal of heat units from the doctor roll, and the temperature responsive control means, and the operative connections between said parts, are constituted to vary the rate of withdrawal of heat units from the doctor roll inversely as the variation of the temperature of the coating material supplied to the crotch.

23. In a roll type surface coater, the combination of a main roll, a doctor roll parallel thereto and in surface proximity to said main roll, means to journal both of said rolls, means to rotate both of said rolls in said journals, and means to urge a substantially horizontal sheet of stock to be coated against the surface of the main roll along a narrow zone of coating contact with the main roll, the main and doctor rolls providing between them a crotch for retaining a body of coating material in surface contact with both of said rolls and for supply of coating material to the surface of the main roll at areas of said main roll in advance of contact of such areas with the surface of said sheet of stock material, the doctor roll comprising a cylindrical element of ferrous material, a coating of acid resisting material on said cylindrical element, and a coating of chromium on said coating of acid resisting material, said coating of chromium being highly polished.

24. Means as defined in claim 23, wherein the coating of acid resisting material comprises a coating of copper.

25. Means as defined in claim 23, wherein the coating of acid resisting material comprises a coating of nickel.

References Cited in the file of this patent

UNITED STATES PATENTS

| | | |
|---|---|---|
| 517,732 | Childs | Apr. 3, 1894 |
| 962,619 | Buffelen | June 28, 1910 |
| 1,124,374 | Wolfe | Jan. 12, 1915 |
| 1,476,988 | Latta | Dec. 11, 1923 |
| 2,133,390 | Kotcher et al. | Oct. 18, 1938 |
| 2,236,005 | Massey | Mar. 25, 1941 |
| 2,319,242 | Lipsius | May 18, 1943 |
| 2,326,429 | Black et al. | Aug. 10, 1943 |
| 2,361,950 | Leech | Nov. 7, 1944 |
| 2,659,340 | Zinn | Nov. 17, 1953 |
| 2,712,508 | Massey | July 5, 1955 |